United States Patent
Szabo et al.

(10) Patent No.: US 8,452,753 B2
(45) Date of Patent: May 28, 2013

(54) METHOD, A WEB DOCUMENT DESCRIPTION LANGUAGE, A WEB SERVER, A WEB DOCUMENT TRANSFER PROTOCOL AND A COMPUTER SOFTWARE PRODUCT FOR RETRIEVING A WEB DOCUMENT

(75) Inventors: Peter Szabo, Pforzheim (DE); Horst Rössler, Filderstadt (DE); Michael Walter Hoche, Immenstaad (DE)

(73) Assignee: Alcatel Lucent, Paris (FR)

( * ) Notice: Subject to any disclaimer, the term of this patent is extended or adjusted under 35 U.S.C. 154(b) by 1753 days.

(21) Appl. No.: 11/183,894

(22) Filed: Jul. 19, 2005

(65) Prior Publication Data

US 2006/0020881 A1    Jan. 26, 2006

(30) Foreign Application Priority Data

Jul. 20, 2004    (EP) .................................... 04291846

(51) Int. Cl.
G06F 17/30 (2006.01)
G06F 7/00 (2006.01)
H04N 7/173 (2011.01)

(52) U.S. Cl.
USPC ............................. 707/713; 707/811; 725/112

(58) Field of Classification Search
USPC ........................................ 707/10; 715/501.1
See application file for complete search history.

(56) References Cited

U.S. PATENT DOCUMENTS

| | | | | |
|---|---|---|---|---|
| 5,822,539 A * | 10/1998 | van Hoff | ...................... | 709/236 |
| 5,941,944 A * | 8/1999 | Messerly | ...................... | 709/203 |
| 5,978,848 A * | 11/1999 | Maddalozzo et al. | ........ | 709/227 |
| 6,026,433 A * | 2/2000 | D'Arlach et al. | ............. | 709/217 |
| 6,145,003 A * | 11/2000 | Sanu et al. | ..................... | 709/225 |
| 6,341,305 B2 * | 1/2002 | Wolfe | ........................... | 709/203 |
| 6,418,448 B1 * | 7/2002 | Sarkar | ........................ | 707/104.1 |
| 6,625,624 B1 * | 9/2003 | Chen et al. | .................... | 707/204 |
| 6,631,496 B1 * | 10/2003 | Li et al. | ...................... | 715/501.1 |
| 6,822,663 B2 * | 11/2004 | Wang et al. | ................... | 715/854 |
| 2001/0056418 A1 * | 12/2001 | Youn | ................................. | 707/3 |
| 2002/0078105 A1 * | 6/2002 | Hamada et al. | ............... | 707/530 |
| 2002/0194382 A1 * | 12/2002 | Kausik et al. | ................. | 709/246 |
| 2003/0050915 A1 * | 3/2003 | Allemang et al. | ................ | 707/1 |
| 2003/0105819 A1 * | 6/2003 | Kim et al. | .................... | 709/205 |
| 2004/0006560 A1 * | 1/2004 | Chan et al. | ....................... | 707/3 |
| 2004/0133635 A1 * | 7/2004 | Spriestersbach et al. | ..... | 709/203 |
| 2005/0086206 A1 * | 4/2005 | Balasubramanian et al. | .... | 707/3 |

(Continued)

OTHER PUBLICATIONS

Information Retrieval on the Web Mei Kobayashi and Koichi Takeda IBM Research ACM Computing Surveys, vol. 32, No. 2, 2000.*

(Continued)

Primary Examiner — Pierre M. Vital
Assistant Examiner — Berhanu Mitiku
(74) Attorney, Agent, or Firm — Sughrue Mion, PLLC

(57) ABSTRACT

The invention relates to a method for retrieving a web document provided by a web server, where the method comprising the usual steps of requesting a web document from the web server and replying with the web document, extended by the steps of requesting an analysis according to an inspection requirement, analyzing the content of the web document according to inspection requirements at the web server, and replying an analyzing result. The invention relates inter alia to a web document description language, a web server, a web document transfer protocol, and a computer software product for retrieving a web document.

7 Claims, 4 Drawing Sheets

U.S. PATENT DOCUMENTS

2005/0182770 A1* 8/2005 Rasmussen et al. ............ 707/10
2005/0221267 A1* 10/2005 Berman ........................ 434/323
2005/0233293 A1* 10/2005 Berman ........................ 434/323
2005/0262089 A1* 11/2005 Wu ................................ 707/10

OTHER PUBLICATIONS

Designing Interaction Paradigms for Web-Information Search and Retrieval Ya-Wen Hsu, Naureen Moon, Rahul Singh Dec. 2006 Proceedings of the 2006 IEEE/WIC/ACM International Conference on Web Intelligence WI '06 Publisher: IEEE Computer Society.*

DHTTP: An Efficent and Cache-Friendly Transfer Protocol for the Web Michael Rabinovich, Hua Wang Dec. 2004 IEEE/ACM Transactions on Networking (TON), vol. 12 Issue 6 Publisher: IEEE Press.*

Task-Oriented World Wide Web Retrieval by Document Type Classification Katsushi Matsuda, Toshikazu Fukushima Nov. 1999 Proceedings of the eighth international conference on Information and knowledge management CIKM '99 Publisher: ACM Press.*

Bry et al. "Towards a Declarative Query and Transformation Language for XML and Semistructured Data: Simulation Unification" Technical Report, Computer Science Institute, Munich, Germany http://www.pms.informatik.uni-muenchen.de/publikationen, Forschungsbericht/Research Report PMS-FB-2002-2, Feb. 2002.*

Bry "A Gentle Introduction into Xcerpt, a Rule-Based Query and Transformation Language for XML", Technical Report, Computer Science Institute, Munich Germany, PMS-FB-2002-11, Jun. 2002.*

J. Saias et al, "Semantic enrichment of a Web legal information retrieval system", Legal Knowledge and Information Systems, JURIX 2002. 15$^{th}$ Annual conference IOS Press Amsterdam, Netherlands, Dec. 2002, pp. 11-19, XP002311982.

Francois Bry et al, "A Gentle Introduction into Xcerpt" Online! Jun. 2002, XP002311983, Munich, Germany.

"Media Semantics Character Builder v3.0 User Guide", Sep. 8, 2003, Media Semantics, XP002311984, pp. 50-57.

Media Semantics: "KB100: Current build and build history" 'Online!—Retrieved from Internet Dec. 20, 2004—http://ww.mediasemantics.com/KBKB100.

* cited by examiner

METHOD, A WEB DOCUMENT DESCRIPTION LANGUAGE, A WEB SERVER, A WEB DOCUMENT TRANSFER PROTOCOL AND A COMPUTER SOFTWARE PRODUCT FOR RETRIEVING A WEB DOCUMENT

TECHNICAL FIELD

The present invention relates to a method for retrieving a web document. More particularly, the present invention relates to a web document description language, a web server, a web document transfer protocol and a computer software product.

The invention is based on a priority application, EP 04291846.6, which is hereby incorporated by reference.

BACKGROUND OF THE INVENTION

The Internet comprises mainly web servers and clients. A web server is a computer that delivers (serves up) hyper text mark-up language (HTML) pages. Every web server has an internet protocol (IP) address and possibly a domain name. If a client requests a resource via a uniform resource locator/identifier (URL/URI) a request is sent to a server corresponding to the URL/URI.

A web document is a representation of information in a description language like HTML, or XHTML, that is dedicated to be transferable (according to a certain protocol) from a server to a client and that (the information) could be rendered, i.e. presented, at the client.

Hypertext transfer protocol (HTTP) is the underlying protocol used by the server and the client. HTTP defines how messages are formatted and transmitted, and what actions a web server and client should take in response to various commands. For example, when requesting a URL in at a client, this actually sends an HTTP command to the web server directing it to fetch and transmit the requested page.

The other main standard that controls how the world wide web works is hyper text markup language (HTML), which governs how web pages are formatted and displayed.

HTTP is called a stateless protocol because each command is executed independently, without any knowledge of the commands that came before it. This is the main reason that it is difficult to implement web sites that react intelligently.

HTML and HTTP are specified by the world wide web consortium.

The current set of common methods for HTTP is GET, HEAD, POST, PUT, DELETE, TRACE and CONNECT. The GET method retrieves whatever information (in the form of an entity) is identified by the Request-URI. If the Request-URI refers to a data-producing process, it is the produced data which shall be returned as the entity in the response and not the source text of the process, unless that text happens to be the output of the process.

The semantics of the GET method can change to a "conditional GET" if the request message includes an If-Modified-Since, If-Unmodified-Since, If-Match, If-None-Match, or If-Range header field. A conditional GET method requests that the entity be transferred only under the circumstances described by the conditional header field(s). The conditional GET method is intended to reduce unnecessary network usage by allowing cached entities to be refreshed without requiring multiple requests or transferring data already held by the client.

The semantics of the GET method change to a "partial GET" if the request message includes a range header field. A partial GET requests that only part of the entity be transferred. The partial GET method is intended to reduce unnecessary network usage by allowing partially-retrieved entities to be completed without transferring data already held by the client.

All HTTP entities are represented in HTTP messages as sequences of bytes and the concept of a byte range is meaningful for any HTTP entity used for partial GET method. A byte range operation may specify a single range of bytes, or a set of ranges within a single entity.

In order to realize (dynamic) reactive or interactive web sites other technologies have to be involved. The form technique for client server interaction is for example enhanced by a simple object application protocol integration in Xforms. There are certain web server enhancements like application servers that generate dynamical web pages or web servers that are enabled to execute servelets, e.g. Tomcat, active server pages, or script languages like Java script or PHP.

Current internet transfer protocols are neither suited to exchange nor to interact on a semantical (content based) level. They mainly support navigation by hyper-linking and transferring information based on address, like URIs, i.e. a referential interaction.

The process of retrieval is usually separated into a page providing means like forms to formulate a request that is forcing a query in some foreign presentation, e.g. a database, generating from the query result a new page and delivering the new page to the requesting party.

Current developments like Xcerpt, which is a declarative, rule-based query and transformation language for XML, inspired by logic programming, fail to embed or integrate similarly presented information. (Instead of the path-based navigational approach taken by languages like XSLT and XQuery, Xcerpt uses pattern-based, positional queries, where a pattern is an "example" of the database containing variables for binding content.)

When seeking for special content search engines have to aggregate published content to make them indexed accessible, e.g. via pattern matching search or e.g. a Boolean query on a database. Internet search engines usually are powerful clusters of computers with huge databases storing indexed web content, continuously scanning and/or referring links per keyword or search expression.

The problem to be targeted by this invention is to enhance the retrieval capabilities of a network like the Internet and to enhance cohesion of relating web documents by replacing the straightforward (referential) approach that is currently followed (i.e. instead of providing a manifold of search engines assembling summary information, providing automatically summarizing self-organizing web documents).

Currently it is not possible to ask a server whether the server provides a page satisfying a certain property. Such a property might be for instance a unification condition.

Unification informally is a generalization of pattern matching that is the logic programming equivalent of instantiation in logic. When two terms, e.g. web documents, are to be unified, they are compared with each other in order to identify information for adapting them to be similar. Variable parts, e.g. a place holder or a wild card, are bound or instantiated that the both documents are similar. This concept could for instance be realized with Robinson's algorithm. The result of unification is either failure or success with a set of variable bindings, known as a "unifier". There may be many such unifiers for any pair of terms. An overview about the theory of unification is provided by Baader and Snyder in their Chapter on Unification Theory in "The Handbook of Automated Reasoning", Elsevier Science Publishers, 1999.

The retrieval capabilities are enhanced, i.e. the problem is solved by a method for retrieving a web document provided by a web server, where the method comprising the following steps requesting a first web document from the web server requesting a content analysis of a second web document according to an inspection requirement that is comprised by the first web document, analyzing the content of the second web document according to the inspection requirements, integrating an analyzing result into the first web document and finally replying this first web document.

When using unification within the analyzing the resulting web document might contain variables. Furthermore it should be noted that the information exchange is no more directed as in the former client server method, i.e. the bindings could be propagated from requesting site to serving site and vice versa.

The problem is solved inter alia by a web document description language comprising expression means for publishing information for distribution and for retrieving interactive information, further comprising expression means for actively requesting a web document analysis according to inspection requirements and expression means for integrating an analyzing result.

And the problem is solved by a web document transfer protocol comprising the steps of transmitting a web document request from a client to a server and replying according to the web document request, where said web document request comprises inspection requirements on a web document that is triggering an analysis at the server, and that the result of the analysis is replied.

The problem is solved inter alia by a web server comprising receiving means for receiving a web document request, retrieval means for retrieving a web document, and replying means for replying the web document, the web server further comprising inspection means for analyzing the content of the web document according to inspection requirements, and the replying means being adapted to reply an analyzing result.

In other words: Add an application programming interface for analyses with respect to syntactic terms to web documents, where the web documents comprise placeholders (variables), suited to embed analysis results. Preferably this analysis is unification based. That could be a syntactic unification of web documents with variables, a matching mechanism, i.e. a restrictive unification, or even a unification modulo a certain theory, a so called semantic unification, a unification with or without constraints, an analysis with respect to any congruence relation instead of equality, etc.

Formally a unification problem is abstractly treated as a set of relating (hypermedia) objects $O1, \ldots, On$ comprising variables $X1, \ldots, Xm$ with respect to relations $R1, \ldots Rk$, e.g.

$O1(X1,X2)$ $R1$ $O2(X2,X3)$ $O2(X2,X3)$ $R2$ $O3(X4)$ $O1(X1,X2)$ $R1$ $O3(X4)$

A solution is a variable binding i.e. a mapping $X1 \to S1$, $X2 \to S2$, $X3 \to S3$, and $X4 \to S4$ such that $O1(S1,S2)$ $R1$ $O2(X2,X3)$ $O2(S2,S3)$ $R2$ $O3(S4)$ $O1(S1,S2)$ $R1$ $O3(S4)$ applies. In words that the placeholders are substituted (instantiated) by substitutes (real objects) that fulfill the constraint, i.e. such that the objects are in relation.

SUMMARY OF THE INVENTION

Accordingly, it is an object and advantage of the present invention to provide dynamic web document resources with interfaces that allow content and structure based information access and exchange.

Another advantage of the present invention is that it generalizes the well known request reply interaction metaphor of web documents. The invention generalizes the current servers and clients, e.g. browsers. The concept is easy to understand and easy to deploy. It enhances information retrieval and consistency, hence large deployment expected. There are efficient unification algorithms available that might be applicable for this purpose.

A further advantage of the present invention is that it reduces memory and processing requirements especially for search engines due to the distribution of the analysis complexity (natural distribution, load balancing). When applying unification the analysis even becomes associative and commutative which has the advantage of a high degree of freedom for the distribution of the unification (analyzing); i.e. associativity and commutativity of unification supports parallel distributed processing $$\text{unify}(A, \text{unify}(B,C)) = \text{unify}(\text{unify}(A,B),C)$$

$$\text{unify}(A,B) = \text{unify}(B,A).$$

And the invention supports future "WEB-centric" applications like the semantic web heavily depending on content (information) exchange.

BRIEF DESCRIPTION OF THE DRAWINGS

These and many other objects and advantages of the present invention will become apparent to those of ordinary skill in the art from a consideration of the drawings and ensuing description, where.

Those of ordinary skill in the art will realize that the following description of the present invention is illustrative only and is not intended to be in any way limiting. Other embodiments of the invention will readily suggest themselves to such skilled persons from an examination of the within disclosure.

Web content unification (information adaptation) will play a central role in intelligent multimedia collaboration and communication. Especially access and retrieval of multimedia information within a browser need to be enhanced. Pure address based access is not suitable. Neither ontology and hierarchies nor search engines are suited to handle information presentation and retrieval within networks apropriately.

Currently there are a bunch of search engines and access methods for multimedia information, e.g. Netscape's funnel, google, personalized portals, uniform resource (locators) identifiers, hierarchical or relational organizations of information, etc. The basic information exchange is syntactic pattern matching using an interview. This is inefficient and hides information (e.g. shapes or contexts) within an interview process.

Therefore it is suggested to enhance web document access for queries with syntactic terms comprising variables, suited for unification and perform a matching or even a unification as a retrieval mechanism at a web server.

The current HTML documents provide hyper reference concepts for fetching a document as a whole. This is disadvantageous concerning e.g. search engine applications or semantic networks. The current trend to overcome this lack of information retrieval is to collect, analyze, compute, and store (index) web pages by robots and the like.

DETAILED DESCRIPTION OF THE INVENTION

Figure 1:
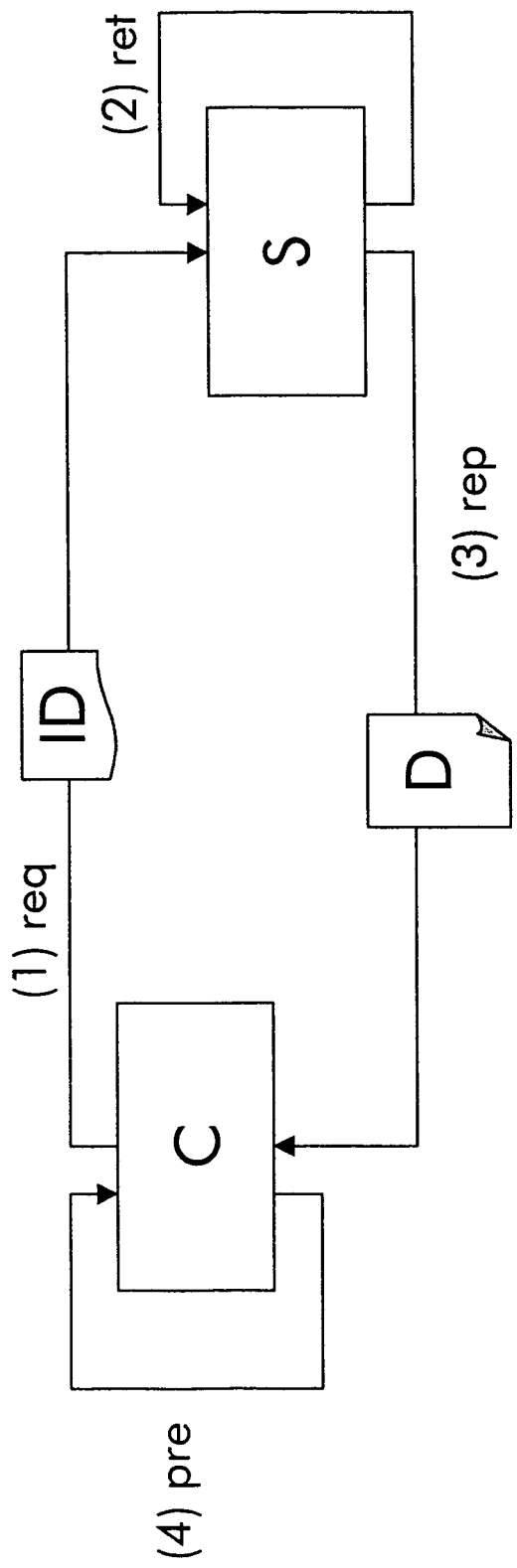
FIG. 1 is a schematic drawing showing the prior art client server relationship for retrieving a web document.

Currently, as shown in FIG. 1, a client C, usually a web browser, requests (1) req using a resource identifier ID like a URI a web document D from a server S. The server S retrieves (2) ret in a second step the requested document D and replies (3) rep with the document D or more precisely with a description of the document, e.g. HTTP, according to a certain transfer protocol, e.g. http, to the client C. The client C presents (4) pre this document D.

HTML/http technique allows to request and transfer complete web documents (or partial prefixes). Applying this technique is well known e.g. by search engines collecting continuously (or storing simply a dictionary of) web page information, i.e. web documents, and aggregating the information for textual retrievals.

In the following the Java application programming interfaces for certain classes are used to explain the invention.

An instance of the class HttpURLConnection is used to make a single request but the underlying network connection to a HTTP. The methods of this class exactly reflect the properties of http/HTML communication:

| | |
|---|---|
| disconnect( ) | Indicates that other requests to the server are unlikely in the near future. |
| getErrorStream( ) | Returns the error stream if the connection failed but the server sent useful data nonetheless. |
| getFollowRedirects( ) | Returns a Boolean indicating whether or not HTTP redirects should be automatically followed. |
| getHeaderField(int n) | Returns the value for the nth header field. |
| getHeaderFieldDate(String name, long Default) | Returns the value of the named field parsed as date. |
| getHeaderFieldKey(int n) | Returns the key for the nth header field. |
| getInstanceFollowRedirects( ) | Returns the value of this HttpURL Connection's instanceFollowRedirects field. |
| getPermission( ) | Returns a permission object representing the permission necessary to make the connection represented by this object. |
| getRequestMethod( ) | Get the request method. |
| getResponseCode( ) | Gets the status code from an HTTP response message. |
| getResponseMessage( ) | Gets the HTTP response message, if any, returned along with the response code from a server. |
| setChunkedStreamingMode (int chunklen) | This method is used to enable streaming of a HTTP request body without internal buffering, when the content length is not known in advance. |
| setFixedLengthStreaming Mode(int contentLength) | This method is used to enable streaming of a HTTP request body without internal buffering, when the content length is known in advance. |
| setFollowRedirects(boolean set) | Sets whether HTTP redirects (requests with response code 3xx) should be automatically followed by this class. |
| setInstanceFollowRedirects (boolean followRedirects) | Sets whether HTTP redirects (requests with response code 3xx) should be automatically followed by this HttpURLConnection instance. |
| setRequestMethod(String method) | Set the method for the URL request, one of: GET POST HEAD OPTIONS PUT DELETE TRACE are legal, subject to protocol restrictions. |
| usingProxy( ) | Indicates if the connection is going through a proxy. |

The class HTMLDocument extends DefaultStyledDocument. It is a document that models HTML. The purpose of this model is to support both browsing and editing. As a result, the structure described by an HTML document is not exactly replicated by default. The element structure that is modeled by default, is built by the class HTMLDocument.HTMLReader, which implements the HTMLEditorKit.ParserCallback protocol that the parser expects. To change the structure one can subclass HTMLReader, and reimplement the method getReader(int) to return the new reader implementation. The documentation for HTMLReader should be consulted for the details of the default structure created. The intent is that the document be non-lossy (although reproducing the HTML format may result in a different format).

The document models only HTML, and makes no attempt to store view attributes in it. The elements are identified by StyleContext.NameAttribute attribute, which identifies the kind of element. The Base property determines the URL against which relative URLs are resolved. The default content storage mechanism for this document is a gap buffer.

There are multiple methods in this class like extension and constructor methods

| | |
|---|---|
| create(DefaultStyledDocument.ElementSpec[] data) | Replaces the contents of the document with the given element specifications. |
| createBranchElement(Element parent, AttributeSet a) | Creates a document branch element, that can contain other elements. |
| createDefaultRoot( ) | Creates the root element to be used to represent the default document structure. |
| createLeafElement(Element parent, AttributeSet a, int p0, int p1) | Creates a document leaf element that directly represents text. |
| fireChangedUpdate(DocumentEvent e) | Notifies all listeners that have registered interest for notification on this event type. |
| fireUndoableEditUpdate(UndoableEditEvent e) | Notifies all listeners that have registered interest for notification on this event type. |

Retrieval and access methods are comfortable due to the fact they are based on an appropriate parser

| | |
|---|---|
| getBase( ) | Returns the location to resolve relative URLs against. |
| getElement(Element e, Object attribute, Object value) | Returns the child element of e that contains the attribute, attribute with value value, or null if one isn't found. |
| getIterator(HTML.Tag t) | Fetches an iterator for the specified HTML tag. |
| getElement(String id) | Returns the element that has the given id Attribute. |
| getParser( ) | Returns the parser that is used when inserting HTML into the existing document. |

Even embedding is comfortably handled by the methods

| | |
|---|---|
| insert(int offset, DefaultStyledDocument.ElementSpec[]data) | Inserts new elements in bulk. |
| insertAfterEnd(Element elem, String htmlText) | Inserts the HTML specified as a string after the the end of the given element. |
| insertAfterStart(Element elem, String htmlText) | Inserts the HTML specified as a string at the start of the element. |
| insertBeforeEnd(Element elem, String htmlText) | Inserts the HTML specified as a string at the end of the element. |
| insertUpdate(AbstractDocument.DefaultDocumentEvent chng, AttributeSet attr) | Updates document structure as a result of text insertion. |
| insertBeforeStart(Element elem, String htmlText) | Inserts the HTML specified as a string before the start of the given element. |

Even the replacement of a given element in the parent with the contents specified as an HTML string is realized by setOuterHTML(Element elem, String htmlText).

What this implementation explicitly shows is that it lacks to support any scanning for document for contents: The invention provides an enhanced document (search result document and searched document) interaction capability by an information retrieval API. Such an API might be at first glance a syntactic match, e.g.

public boolean matches(DocumentExpression regex)

telling whether or not "this" (the web document object itself) matches the given regular document expression. An invocation of this might yield exactly true if, and only if, this (document) matches the given regular expression.

Alternatively it might even unify semantically or structurally both documents with a side effect of instantiating variables within this document.

The method could be associated e.g. to the HTMLdocument class. As a result the objects, i.e. the documents could gradually exchange information via the suggested interaction method, namely a unification, a constrained unification or an generalized unification where the equality is a specified equivalence relation. A comfortable interface might be unifyElements(VariableHTMLdocument htmlExpression, Constraints constraints, Relation relation)

that returns a unifier, i.e. a substitution of elements binding the free variables in the htmlExpression, such that the HTML-document and the htmlExpression where the variables are substituted are in relation under the constraints.

Figure 2:
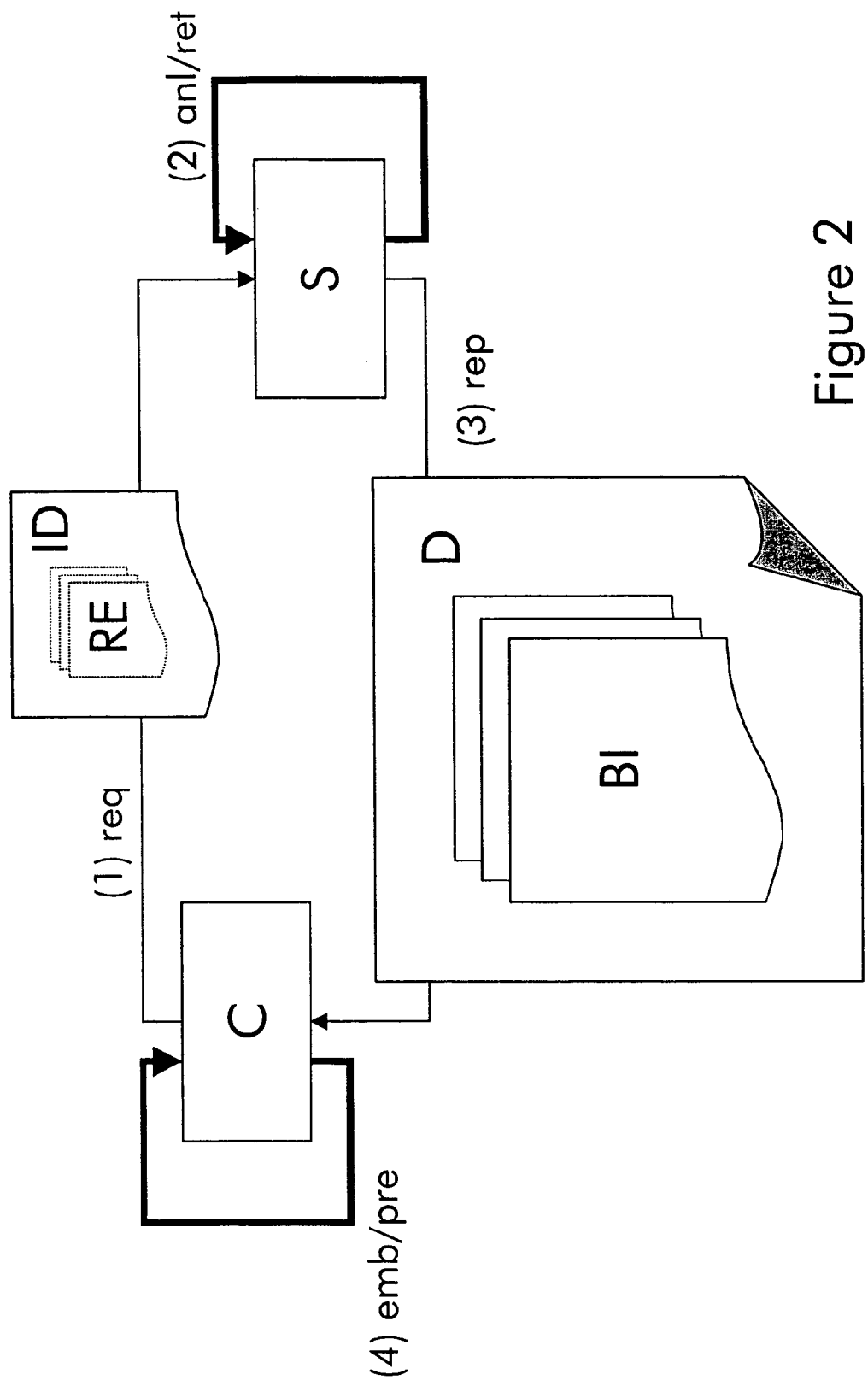
FIG. 2 is a schematic drawing illustrating the method for retrieving a web document provided by a web server according to the invention

The collaboration enabled by this enhancement is shown in FIG. 2. A client C requests (1) req in a first step a unifier (or a matcher of a web document) specified by a resource identifier ID and a unification problem RE like the above parameters. The server S then has to evaluate, i.e. to carry out a corresponding reply. It has to analyze, retrieve and compute (2) anl/ret the requested unifier in a second step. After that the server S should communicate (3) rep the result web document D with the information binding BI, which is in case of unification a unifier. The client C could the receive this information and embed it (4) emb/pre in a further step into an already loaded web document, or simply present it.

The generalization of requests in combination with the analysis and inspection methods at a server allows queries with wild cards. Such a retrieval (also a unification problem) might for instance be: "dear telco-vendor server could you please provide me all the page bodies of your pages containing the word "product" and "mobile" having also a link to a product sheet pdf." The tricky effect is that expressions containing all correspond simply to variables, type and structure information like product, mobile or .pdf are handled by unification separating valid pages from a defined set of all pages defined by an expression defining a set of pages, i.e. the ones that are located at a telco-vendor server. Even the server address could be unified applying this concept.

A distributor might use this automatically collected information for providing a page with an aggregation of the information—without inter-linking the sites and taking care about referential (link) integrity.

Figure 3:
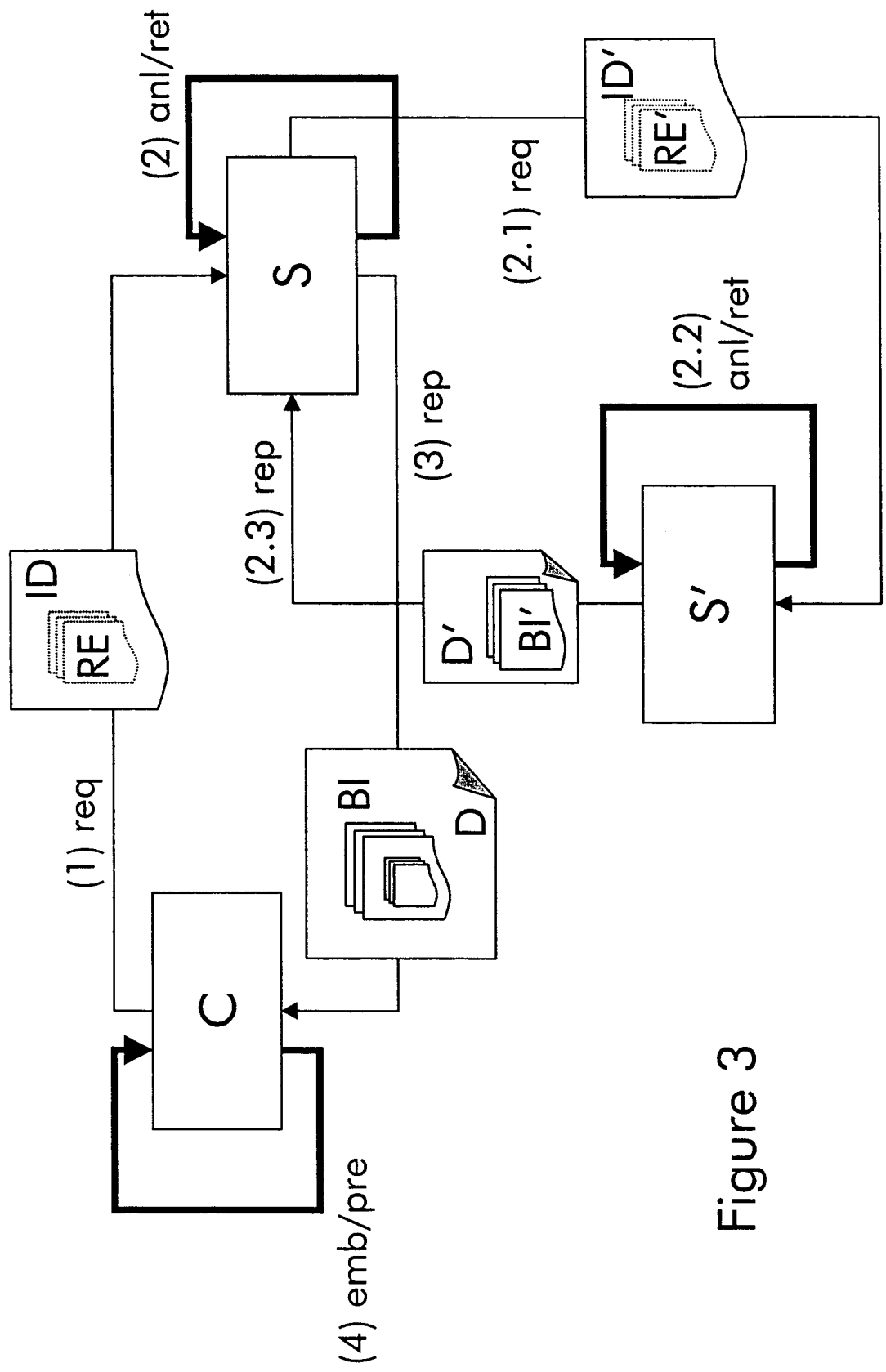
FIG. 3 is a schematic drawing of an iterated application of the method according to the invention.

FIG. 3 shows an iterated application of the principle illustrated in FIG. 2. A client C requests (1) req a unifier specified by a resource identifier ID and a unification problem RE. A server S fulfills this request in a second step (2) anl/ret. While unifying the server S notices that a further web document S' might be involved that is specified by a resource identifier ID' and a unification problem RE'. Thus the server request (2.1) req the foreign web document (unifier) S' providing the unknown information binding BI', that is derived at any server S' within another retrieval, inspection, and analysis step (2) anl/ret. The result, i.e. the foreign web document D' is then replied to the server S and is there taken into account when deriving a unifier according to the first request (1) req specified by a resource identifier ID and a unification problem RE. When the server S has computed the resulting web document D with the binding BI is replied (3) rep to the client C. The client C is finally enabled to embed it (4) emb/pre in a further step into an already loaded web document, or simply present it.

The figure and the scenario illustrate that such enhanced web documents seems to be morphing entities. They seem to live and alter as soon as the result of foreign embedded unifying web documents alter. The example also shows that the load is distributed through the whole network. And the example teaches that a server can act as a client in a canonical way.

In summary the retrieval of information is enhanced by accessing a web document via an inspection mechanism informing the retriever about the content (semantics).

Figure 4:
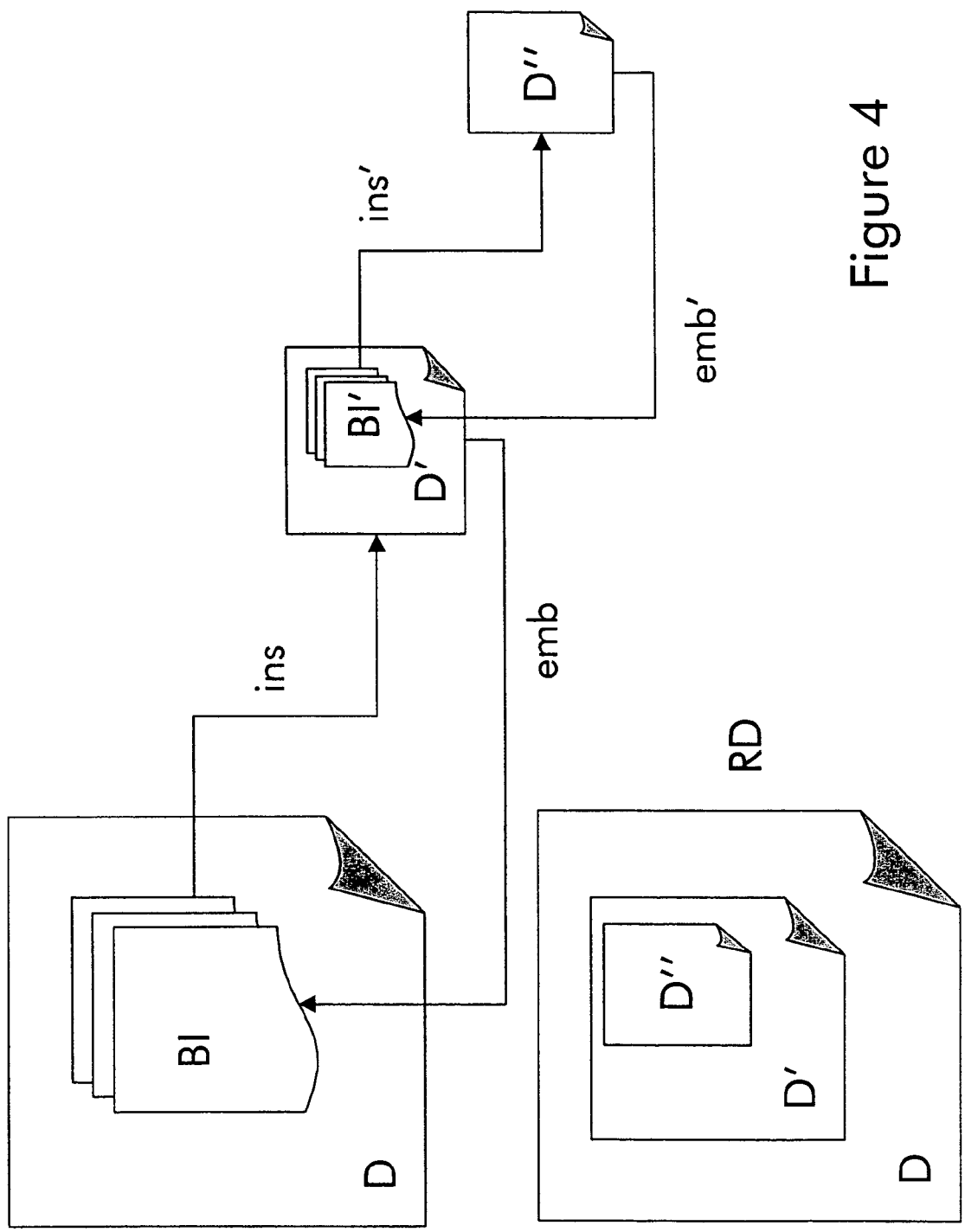
FIG. 4 is a schematic drawing illustrating the web document transfer protocol according to the invention.

Abstracting the example from the client server implementation and focussing on the web documents and transfer protocol leads to FIG. 4. There, a web document D is shown having an embedded web document D', itself having an embedded document D", recursively. The description of document D contains a unification request that is assumed to lead to a corresponding unifier binding BI by inspecting ins a foreign document D' and integrating or embedding emb the result of the inspection, e.g. the aforementioned unifier. The foreign document D' might itself contain a unification request that is assumed to lead to a corresponding unifier binding BI'. And, recursively it leads to a corresponding unifier binding BI by inspecting ins' a further foreign document D" and embedding emb' the result of the inspection. In order to avoid infinite cyclic relationships the protocol might not allow to involve an already involved document.

Although illustrative presently preferred embodiments and applications of this invention are shown and described herein, many variations and modifications are possible which remain within the concept, scope, and spirit of the invention, and these variations would become clear to those of skill in the art after perusal of this application.

For instance the retrieval process could be arranged so that the final unifier, i.e. the catenation of all intermediate unifiers could be carried out at the initial request originator.

As a unification mechanism e.g. syntactical unification might be applicable with e.g. Martelli, Montanari algorithm although a lazy form of unification e.g. variable matching, weak unification, plain pattern matching, e.g. with the algorithm of Knuth, Morris, and Pratt might be feasible.

There are fast recombination mechanisms for terms with variables known, e.g. the union find algorithm that could be applied for concatenation and for rendering a presentation of an aggregated web document. It should be noted that all techniques applicable to terms apply also to web documents, since these are merely presented as a (labeled) tree, i.e. a term. Thus concepts like sub-term, substitution, unification, rewriting etc. apply straight forward. In case of ambiguous unification results a corresponding iterator could provide all results.

In order to teach the connection between a web document and a representing term the following HTML 4.01 (see e.g. HTML 4.0 W3C Specification) example is given. Similar techniques apply to any structured markup like document presentation languages, e.g. XHTMS, SGML, XML, etc.

An HTML document is usually composed of three parts: a line containing version information, a declarative header section (delimited by the HEAD element), and a body, which contains the document's actual content. Here's an example of a simple HTML document:

```
<!DOCTYPE HTML PUBLIC "-//W3C//DTD HTML 4.01//EN"
    "http://www.w3.org/TR/html4/strict.dtd">
<HTML>
    <HEAD>
        <TITLE>My first HTML document</TITLE>
    </HEAD>
    <BODY>
        <P>Hello world!
    </BODY>
</HTML>
```

A corresponding term could be read as

```
DOCUMENT (
<!DOCTYPE HTML PUBLIC "-//W3C//DTD HTML 4.01//EN"
    "http://www.w3.org/TR/html4/strict.dtd">,
<HTML> (
    <HEAD> (
        <TITLE> (My first HTML document)),
    <BODY> (
        <P> (Hello world!)))
``` where the bold face characters "(",")", and "," are delimiter symbols. In general a markup tag

```
<begin tag param 1, . . . , param 2>
    [| nested tag 1, . . . , nested tag 2|]
<end tag>
``` is translated into the term

```
tag( param 1, . . . , param 2,
    [|term of nested tag 1 |], . . . , [|term of nested tag 2 |])
```

This principle is valid for all markup like languages (or at least the completed versions (see e.g. in the HTML example the end tag of the paragraph "<\p>" is suppressed). Since the above mapping (indeed it is a homomorphism) is infective also each (well-formed) term correspond to a (markup) document.

Such (well formed) terms with variables as introduced in section 2 of the paper of Baader and Snyder (i.e. the free algebra generated by the well formed terms over a set of variable symbols) correspond to document descriptions with holes (placeholders), namely the variables. Consider for example

```
DOCUMENT (
<!DOCTYPE HTML PUBLIC "-//W3C//DTD HTML 4.01//EN"
    "http://www.w3.org/TR/html4/strict.dtd">,
<HTML> (
    <HEAD> (
        <TITLE> (My first HTML document)),
    <BODY> (X))
```

This (well-formed) term has as BODY the variable "X". When unifying against the above given first example (or more precisely matching—since the first example has no variable), a unifier would bind "X" with "<P> (Hello world!)".

Variables, i.e. the holes in documents, might have a dedicated semantics, e.g. limiting the unification universe, i.e. specifying the set against what should be unified or where, i.e. at which site, or how, e.g. lazy, with respect to a theory, by an special algorithm, e.g. without occur check, etc.

Prolog, which stands for PROgramming in LOGic, a logic programming paradigm is close related to this concept. Logic and therefore Prolog is based on the mathematical notions of relations and logical inference. Prolog is a declarative language meaning that rather than describing how to compute a solution, a program consists of a base of facts and logical relationships (rules) which describe the relationships which hold for the given application. Rather then running a program to obtain a solution, the user asks a question. When asked a question, the run time system searches through the data base of facts and rules to determine (by logical deduction) the answer.

Among the features of Prolog are logical variables meaning that they behave like mathematical variables, a powerful pattern-matching facility (unification), a backtracking strategy to search for proofs, uniform data structures, and input and output are interchangeable.

Often there will be more than one way to deduce the answer or there will be more than one solution, in such cases the run time system may be asked to find other solutions (e.g. by back-tracing or providing alternatives in parallel).

In other words: the invention is to equip the web of documents with an inference mechanism allowing to exchange syntactically specified parts of said documents. Any tutorial on Prolog will provide the advantages of unification-like information exchange and how it could be used for modeling information structures. Even the complex retrieval mechanism of web search engines become simple meta interpreters, e.g. in Prolog-like notation, find(A):—
    site(C), find(A at C).
find(A op B at C):—
    find(A at C) op find(B at C).
find(A at C):—
    retrieve(B), unify(A, B).

where the predicates "retrieve" stand for inspecting a document database, "unify" for unifying two web documents, and "site" for retrieving a web site. The infix "op" is a Boolean like (infix) operator.

As one of ordinary skill in the art would recognize, the present invention may take the form of a tangible computer readable medium storing instructions for enabling a computer executing the instructions to perform the method of the invention. Further, one of ordinary skill in the art would recognize that a tangible computer readable medium is a medium which a computer can read but not a carrier wave.

What is claimed is:

1. A method for retrieving a web document provided by a web server, the web document being a structured markup like document, the method comprising:
   requesting a first web document from the web server, the first web document being a first structured markup like document; and
   replying with the first web document; wherein said method further comprises:
   requesting a content analysis of a second web document from a web server according to an inspection requirement, said second web document being a structured markup like document and said inspection requirement being comprised by the first web document, analyzing the content of the second web document according to the inspection requirement, and
   integrating an analyzing result into the first web document;
   wherein said first web document comprises said inspection requirement on the second web document which triggers the content analysis at the server,
   wherein the inspection requirement is a unification problem and the analyzing is a unification;
   wherein the unification problem relates to a set of hypermedia objects comprising variables with respect to relations; and
   wherein the first and second web documents are terms of the unification and where the first web document comprises variable bindings that are the analyzing result.

2. The method according claim 1, wherein the unification has constraints.

3. A computer implemented method for executing a web document transfer protocol comprising:
   transmitting a web document request, from a client to a server, requesting a first web document, the first web document being a first structured markup like document, and
   replying with the first web document according to the web document request, wherein said first web document comprises an inspection requirement on a second web document that is triggering an analyzing at the server,
   wherein said second web document is a second structured markup like document, and the result of the analysis is replied; and
   wherein the inspection requirement is a unification problem and the analyzing is a unification;
   wherein the unification problem relates to a set of hypermedia objects comprising variables with respect to relations; and
   the first and second web documents are terms of the unification and wherein the first web document comprises variable bindings that are the analyzing result.

4. A web server comprising:
   a processor and memory;
   wherein said web server performs operations o1~
   receiving a web document request, the web document request requesting a first web document, the first web document being a first structured markup like document comprising an inspection requirement;
   retrieving a web document, and replying the first web document, wherein the web server further performs operations of:
   analyzing the content of a second web document according to the inspection requirement, wherein said replying replies an analyzing result; and integrating an analyzing result into the first web document;
   wherein the inspection requirement is a unification problem and the analyzing is a unification;
   wherein the unification problem relates to a set of hypermedia objects comprising variables with respect to relations; and
   the first and second web documents are terms of the unification and the first web document comprises variable bindings that are the analyzing result;
   wherein the processor, operating on the memory, performs at least one of the receiving, the retrieving, the replying, the analyzing, and the integrating.

5. A non-transitory computer readable medium having computer instructions for enabling a computer executing the computer instructions to perform a method for retrieving a web document provided by a web server, the web document being a structured markup like document, the method comprising:
   requesting a first web document from the web server, the first web document being a first structured markup like document; and
   replying with the first web document;
   wherein said method further comprises:
   requesting a content analysis of a second web document from a web server according to an inspection requirement, said second web document being a structured markup like document and said inspection requirement being comprised by the first web document,
   analyzing the content of the second web document according to the inspection requirement, and
   integrating an analyzing result into the first web document;
   wherein said first web document comprises said inspection requirement on the second web document which triggers the content analysis at the server,
   wherein the inspection requirement is a unification problem and the analyzing is a unification;
   wherein the unification problem relates to a set of hypermedia objects comprising variables with respect to relations; and
   wherein the first and second web documents are terms of the unification and where the first web document comprises variable bindings that are the analyzing result.

6. The non-transitory computer readable medium according to claim 5, wherein a web document description language is used to represent web documents, said web document description language comprising expression means for presenting information and information access, wherein said web document description language further comprises expression means for requesting a web document analysis according to the inspection requirement and for integrating an analyzing result.

7. The method of claim 1, wherein the second web document is a web page.

* * * * *